(12) United States Patent
Wang et al.

(10) Patent No.: US 12,153,249 B2
(45) Date of Patent: Nov. 26, 2024

(54) DISPLAY DEVICE

(71) Applicant: AUO Corporation, Hsinchu (TW)

(72) Inventors: Cheng-Yu Wang, Hsinchu (TW); Cheng-Min Tsai, Hsinchu (TW)

(73) Assignee: AUO Corporation, Hsinchu (TW)

( * ) Notice: Subject to any disclaimer, the term of this patent is extended or adjusted under 35 U.S.C. 154(b) by 42 days.

(21) Appl. No.: 18/083,587

(22) Filed: Dec. 19, 2022

(65) Prior Publication Data
US 2024/0019629 A1    Jan. 18, 2024

(30) Foreign Application Priority Data

Jul. 14, 2022  (TW) ................................. 111126511

(51) Int. Cl.
*F21V 8/00*    (2006.01)
(52) U.S. Cl.
CPC ........... *G02B 6/009* (2013.01); *G02B 6/0055* (2013.01)
(58) Field of Classification Search
CPC .... G02B 6/009; G02B 6/0055; G02B 6/0078; G02F 1/133615
See application file for complete search history.

(56) References Cited

U.S. PATENT DOCUMENTS

| 7,641,360 B2 * | 1/2010 | Chou | G02F 1/133605 |
| | | | 257/88 |
| 2013/0044509 A1 * | 2/2013 | Chung | G02F 1/133606 |
| | | | 362/613 |
| 2014/0071711 A1 * | 3/2014 | Boulais | G02B 6/0068 |
| | | | 362/613 |
| 2015/0055369 A1 * | 2/2015 | Tarsa | G02B 6/0085 |
| | | | 362/613 |
| 2017/0123133 A1 * | 5/2017 | Park | G02B 6/0078 |

FOREIGN PATENT DOCUMENTS

| CN | 102889523 | 1/2013 |
| CN | 104999965 | 10/2015 |
| CN | 108983493 | 12/2018 |
| CN | 111399276 | 7/2020 |
| JP | 2003295184 | 10/2003 |
| TW | 200639503 | 11/2006 |

\* cited by examiner

*Primary Examiner* — Evan P Dzierzynski
*Assistant Examiner* — Jessica M Apenteng
(74) *Attorney, Agent, or Firm* — JCIPRNET

(57) ABSTRACT

A display device includes a bezel, first and second light guide plates (LGP), first and second light emitting element, first and second reflection sheets, a first fixing member, and at least one display panel. Each of the first and second LGPs has a bottom surface, a light exit surface, a light incident surface, and a first side surface. The first and second reflection sheets are located between the bezel and the first LGP and between the bezel and the second LGP, respectively. Bent portions of the first and second reflection sheets are disposed beside the first side surface of the first LGP and the first side surface of the second LGP, respectively and located between the first side surface of the first LGP and the first side surface of the second LGP. The first fixing member is sandwiched between the bent portions of the first and second reflection sheets.

23 Claims, 4 Drawing Sheets

DISPLAY DEVICE

CROSS-REFERENCE TO RELATED APPLICATION

This application claims the priority benefit of Taiwan application serial no. 111126511, filed on Jul. 14, 2022. The entirety of the above-mentioned patent application is hereby incorporated by reference herein and made a part of this specification.

TECHNICAL FIELD

The disclosure relates to a photoelectric device display and particularly relates to a display device.

DESCRIPTION OF RELATED ART

With the advancement of display technologies, applications of display devices have become more and more diverse. For instance, a display device with a plurality of display regions has been gradually applied in the automotive field, where one of the display regions is normally turned on to display driving information (e.g., vehicle speed, etc.), and another display region serves to display other information (e.g., satellite navigation maps, video and audio information, etc.) and is not normally turned on. There is an intermediate non-display region between the display region that is normally turned on and the display region that is not normally turned on. Generally, in consideration of the appearance of the display device, the intermediate non-display region should be as narrow as possible. When the intermediate non-display region is required to be narrowed down to a certain value, it is impossible to respectively provide a planar light source required by the display region that is normally turned on and the display region that is not normally turned on with use of two independent backlight modules, and the two display regions need to share the same backlight module. However, when the display region that is normally turned on and the display region that is not normally turned on share the same backlight module, and the display device is required to be operated in the unilateral display mode (only the display region that is normally turned on displays images), a light leakage issue is likely to occur in the display region that is not normally turned on.

SUMMARY

The disclosure relates to a display device with favorable performance.

The disclosure relates to another display device with favorable performance.

An embodiment of the disclosure provides a display device that includes a bezel, a first light guide plate (LGP), a second LGP, a first light emitting element, a second light emitting element, a first reflection sheet, a second reflection sheet, a first fixing member, and at least one display panel. The bezel has accommodation space. The first LGP and the second LGP are disposed in the accommodation space of the bezel. Each of the first LGP and the second LGP has a bottom surface, a light exit surface, a light incident surface, and a first side surface. The bottom surface and the light exit surface are disposed opposite to each other, the light incident surface is connected between the bottom surface and the light exit surface, and the first side surface is connected between the bottom surface and the light exit surface and disposed on one side of the light incident surface. The first light emitting element and the second light emitting element are disposed in the accommodation space of the bezel and respectively located beside the light incident surface of the first LGP and the light incident surface of the second LGP. The first reflection sheet and the second reflection sheet are disposed in the accommodation space of the bezel and respectively located between the bezel and the first LGP and between the bezel and the second LGP. Each of the first reflection sheet and the second reflection sheet has a bent portion, the bent portion of the first reflection sheet and the bent portion of the second reflection sheet are respectively disposed beside the first side surface of the first LGP and the first side surface of the second LGP, and the bent portion of the first reflection sheet and the bent portion of the second reflection sheet are located between the first side surface of the first LGP and the first side surface of the second LGP. The first fixing member is sandwiched between the bent portion of the first reflection sheet and the bent portion of the second reflection sheet, where two opposite surfaces of the first fixing member are respectively in contact with the bent portion of the first reflection sheet and the bent portion of the second reflection sheet. At least one display panel is disposed on the light exit surface of the first LGP and the light exit surface of the second LGP.

An embodiment of the disclosure provides a display device that includes a bezel, a first LGP, a second LGP, a first light emitting element, a second light emitting element, a first reflection sheet, a second reflection sheet, a first fixing member, and at least one display panel. The bezel has accommodation space. The first LGP and the second LGP are disposed in the accommodation space of the bezel. Each of the first LGP and the second LGP has a bottom surface, a light exit surface, a light incident surface, and a first side surface. The bottom surface and the light exit surface are disposed opposite to each other, the light incident surface is connected between the bottom surface and the light exit surface, and the first side surface is connected between the bottom surface and the light exit surface and disposed on one side of the light incident surface. The first light emitting element and the second light emitting element are disposed in the accommodation space of the bezel and respectively located beside the light incident surface of the first LGP and the light incident surface of the second LGP. The first reflection sheet and the second reflection sheet are disposed in the accommodation space of the bezel and respectively located between the bezel and the first LGP and between the bezel and the second LGP. Each of the first reflection sheet and the second reflection sheet has a bent portion, the bent portion of the first reflection sheet and the bent portion of the second reflection sheet are respectively disposed beside the first side surface of the first LGP and the first side surface of the second LGP, and the bent portion of the first reflection sheet and the bent portion of the second reflection sheet are located between the first side surface of the first LGP and the first side surface of the second LGP. The first fixing member is sandwiched between the bent portion of the first reflection sheet and the bent portion of the second reflection sheet, where a direction is parallel to the light incident surface and the light exit surface, the first fixing member has a width w in the direction, and 0.15 mm≤w≤6 mm. At least one display panel is disposed on the light exit surface of the first LGP and the light exit surface of the second LGP.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
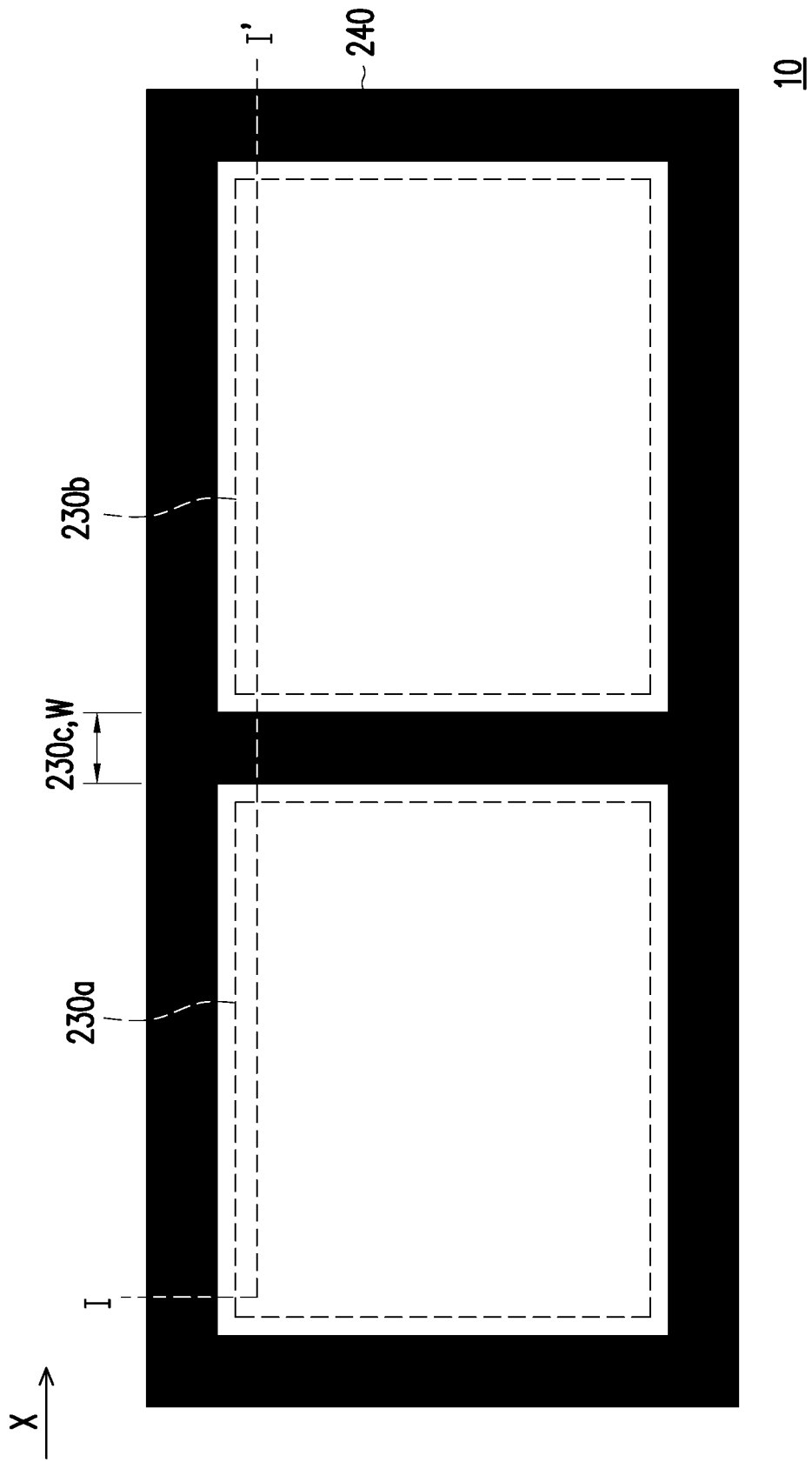
FIG. 1 is a schematic top view of a display device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like parts.

It should be understood that when an element, such as a layer, a film, a region, or a substrate is referred to as being "on" or "connected to" another element, it can be directly on or connected to the another element, or an intermediate element may also be present. By contrast, when an element is referred to as being "directly on" or "directly connected to" another element, no intermediate element is present. As used herein, being "connected" may refer to a physical and/or electrical connection. Furthermore, being "electrically connected" or "coupled" may refer to the presence of other elements between the two elements.

Considering the particular amount of measurement and measurement-related errors discussed (i.e., the limitations of the measurement system), the terminology "about," "approximately," or "substantially" used herein includes the average of the stated value and an acceptable range of deviations from the particular value as determined by those skilled in the art. For instance, the terminology "about" may refer to as being within one or more standard deviations of the stated value, or within ±30%, ±20%, ±10%, or ±5%. Furthermore, the terminology "about," "approximately," or "substantially" as used herein may be chosen from a range of acceptable deviations or standard deviations depending on the optical properties, etching properties, or other properties, rather than one standard deviation for all properties.

Unless otherwise defined, all terminologies (including technical and scientific terminologies) used herein have the same meaning as commonly understood by persons having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the embodiments of the disclosure.

Figure 2:
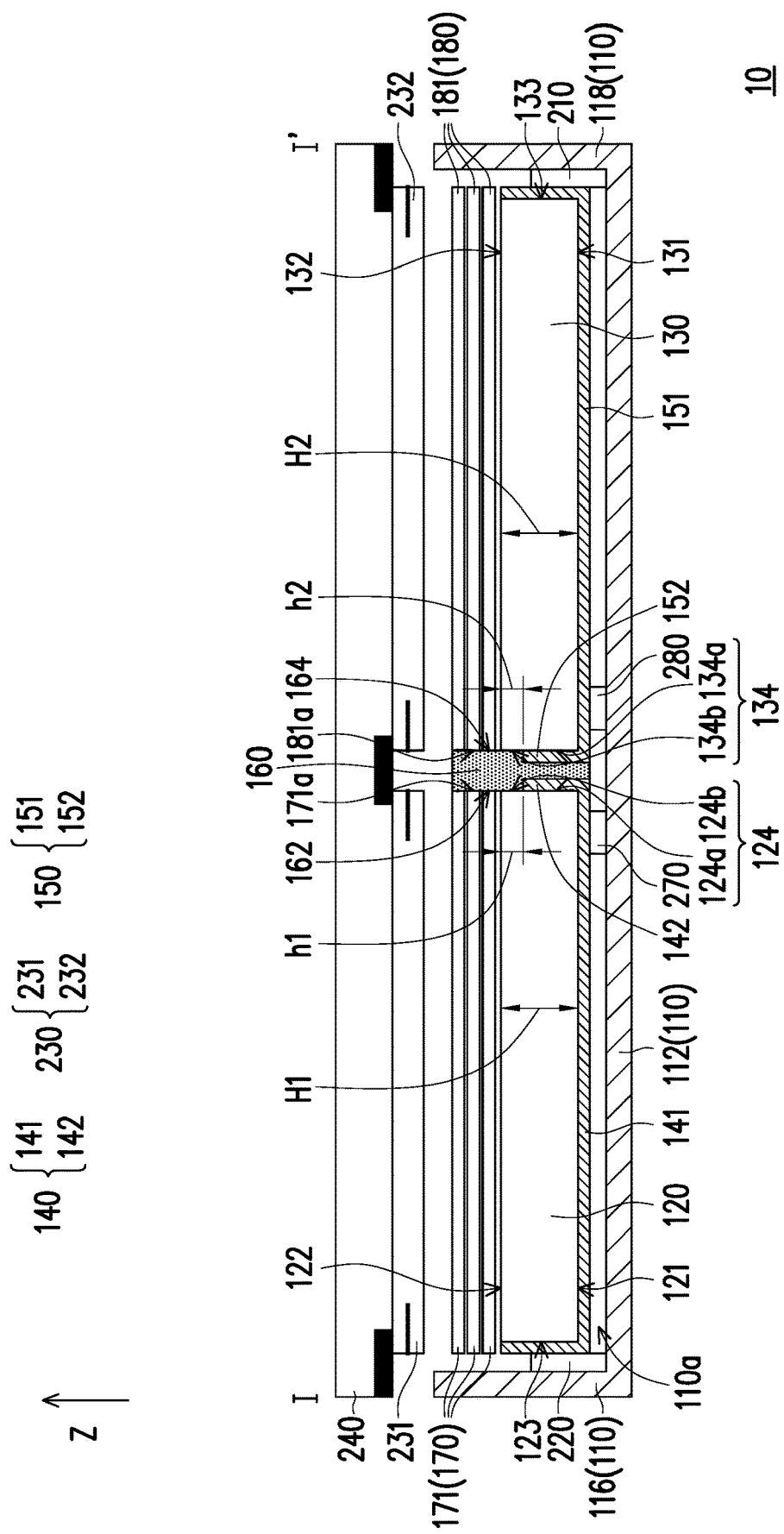
FIG. 2 is a schematic cross-sectional view of a display device according to an embodiment of the disclosure.
Figure 3:
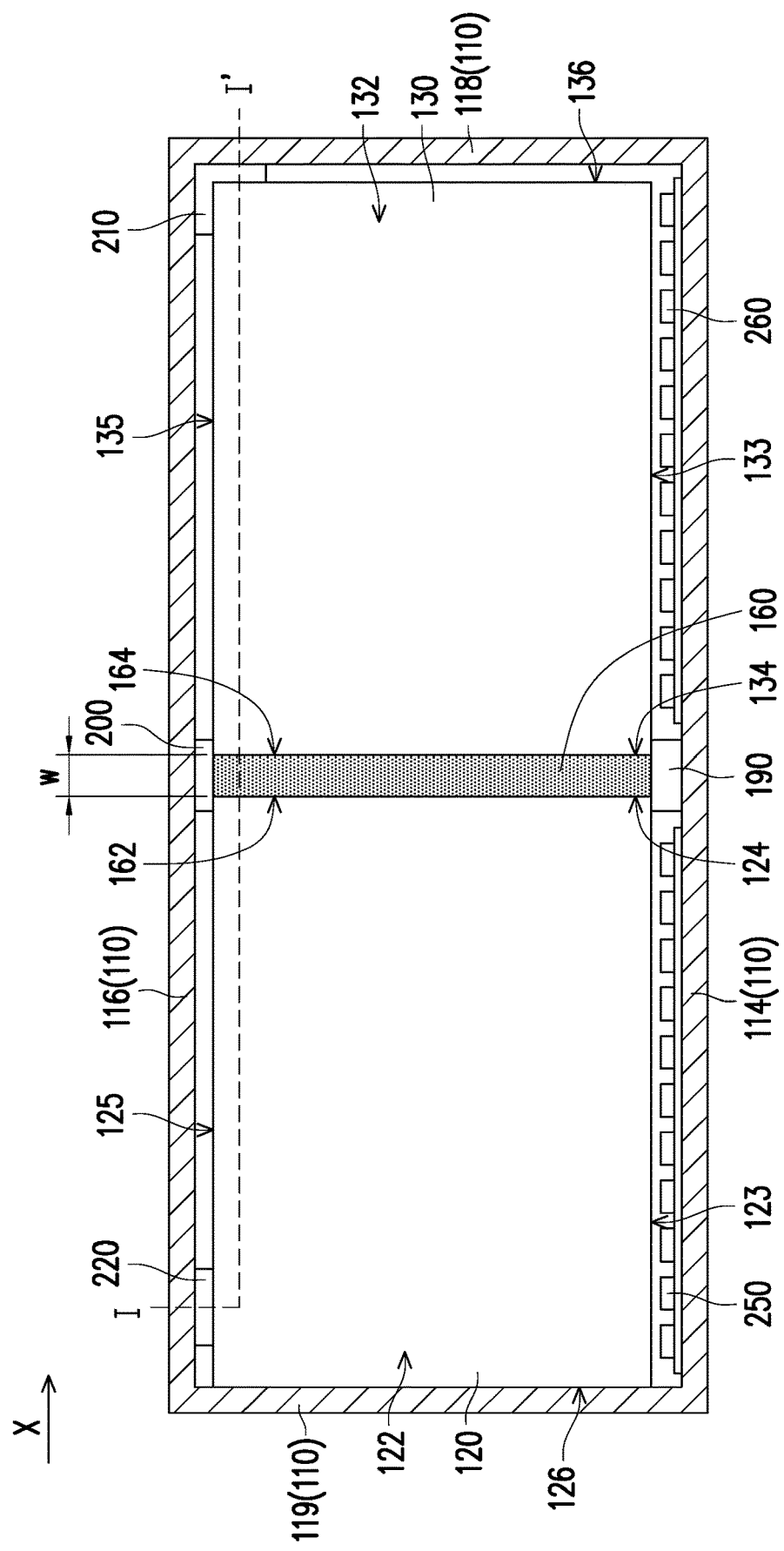
FIG. 3 is a schematic top view of a bezel, a first LGP, a second LGP, a first light emitting element, a second light emitting element, a first fixing member, a second fixing member, a third fixing member, a fourth fixing member, and a fifth fixing member according to an embodiment of the disclosure.

FIG. 1 is a schematic top view of a display device according to an embodiment of the disclosure. FIG. 2 is a schematic cross-sectional view of a display device according to an embodiment of the disclosure. FIG. 3 is a schematic top view of a bezel, a first LGP, a second LGP, a first light emitting element, a second light emitting element, a first fixing member, a second fixing member, a third fixing member, a fourth fixing member, and a fifth fixing member according to an embodiment of the disclosure. FIG. 2 corresponds to a sectional line I-I' depicted in FIG. 1 and FIG. 3. A first reflection sheet 140 and a second reflection sheet 150 depicted in FIG. 2 are omitted from FIG. 3.

With reference to FIG. 2 and FIG. 3, a display device 10 includes a bezel 110. In this embodiment, the bezel 110 includes a bottom board 112, a first sidewall 114, a second sidewall 116 disposed opposite the first sidewall 114, a third sidewall 118 connected between the first sidewall 114 and the second sidewall 116, and a fourth sidewall 119 connected between the first sidewall 114 and the second sidewall 116 and disposed opposite to the third sidewall 118. The first sidewall 114, the second sidewall 116, the third sidewall 118, and the fourth sidewall 119 are extended upward from the bottom board 112 to enclose and define accommodation space 110a of the bezel 110.

The display device 10 further includes a first LGP 120 and a second LGP 130, which are disposed in the accommodation space 110a of the bezel 110. The first LGP 120 and the second LGP 130 are structurally separated from each other. That is, the first LGP 120 and the second LGP 130 are two independent LGPs. Each of the first LGP 120 and the second LGP 130 has a bottom surface 121/131, a light exit surface 122/132, a light incident surface 123/133, and a first side surface 124/134. The bottom surface 121/131 and the light exit surface 122/132 are opposite to each other, the light incident surface 123/133 is connected between the bottom surface 121/131 and the light exit surface 122/132, and the first side surface 124/134 is connected between the bottom surface 121/131 and the light exit surface 122/132 and disposed on one side of the light incident surface 123/133. The first side surface 124 of the first LGP 120 and the first side surface 134 of the second LGP 130 are arranged in a face-to-face manner.

Each of the first LGP 120 and the second LGP 130 further has a second side surface 125/135 disposed opposite to the light incident surface 123/133 and connected between the bottom surface 121/131 and the light exit surface 122/132. Each of the first LGP 120 and the second LGP 130 further has a third side surface 126/136 disposed opposite to the first side surface 124/134, connected between the bottom surface 121/131 and the light exit surface 122/132, and disposed on the other side of the light incident surface 123/133.

The display device 10 further includes a first light emitting element 250 and a second light emitting element 260, which are disposed in the accommodation space 110a of the bezel 110 and are respectively located beside the light incident surface 123 of the first LGP 120 and the light incident surface 133 of the second LGP 130. In this embodiment, the first light emitting element 250 is disposed between the light incident surface 123 of the first LGP 120 and the first sidewall 114 of the bezel 110. The second light emitting element 260 is disposed between the light incident surface 133 of the second LGP 130 and the first sidewall 114 of the bezel 110. In this embodiment, the first light emitting element 250 and the second light emitting element 260 are, for instance, two independently operable light emitting diode bars, which should however not be construed as a limitation in the disclosure.

With reference to FIG. 2, the display device 10 further includes a first reflection sheet 140 and a second reflection sheet 150 that are disposed in the accommodation space 110a of the bezel 110 and respectively located between the bezel 110 and the first LGP 120 and between the bezel 110 and the second LGP 130. Particularly, the first reflection sheet 140 includes a main portion 141 and a bent portion 142, the main portion 141 of the first reflection sheet 140 is disposed beside the bottom surface 121 of the first LGP 120, and the bent portion 142 of the first reflection sheet 140 is disposed on the first side surface 124 of the first LGP 120; the second reflection sheet 150 includes a main portion 151 and a bent portion 152, the main portion 151 of the second reflection sheet 150 is disposed below the bottom surface 131 of the second LGP 130, and the bent portion 152 of the second reflection sheet 150 is disposed beside the first side surface 134 of the second LGP 130. The bent portion 142 of the first reflection sheet 140 and the bent portion 152 of the second reflection sheet 150 are located between the first side surface 124 of the first LGP 120 and the first side surface 134 of the second LGP 130.

In this embodiment, the bent portion 142 of the first reflection sheet 140 covers a first portion 124a of the first side surface 124 of the first LGP 120 but does not cover a second portion 124b of the first side surface 124 of the first LGP 120. A Z direction is vertical to the light exit surface 122 of the first LGP 120. The entire first side surface 124 of the first LGP 120 has a width H1 in the X direction. The second portion 124b of the first side surface 124 of the first LGP 120 has a width h1 in the Z direction. In this embodiment, $¼ \leq (h1/H1) \leq ½$, which should however not be construed as a limitation in the disclosure.

In this embodiment, the bent portion 152 of the second reflection sheet 150 covers a first portion 134a of the first side surface 134 of the second LGP 130 but does not cover a second portion 134b of the first side surface 134 of the second LGP 130. The Z direction is vertical to the light exit surface 132 of the second LGP 130. The entire first side surface 134 of the second LGP 130 has a width H2 in the Z direction. The second portion 134b of the first side surface 134 of the second LGP 130 has a width h2 in the Z direction. In this embodiment, $¼ \leq (h2/H2) \leq ½$, which should however not be construed as a limitation in the disclosure.

In this embodiment, the display device 10 may further include double-sided adhesives 270 and 280. The double-sided adhesive 270 is disposed between the main portion 141 of the first reflection sheet 140 and the bottom board 112 of the bezel 110 to secure the first reflection sheet 140 onto the bezel 110. The double-sided adhesive 280 is disposed between the main portion 151 of the second reflection sheet 150 and the bottom board 112 of the bezel 110 secure fix the second reflection sheet 150 onto the bezel 110.

With reference to FIG. 1 and FIG. 2, the display device 10 further includes at least one display panel 230 disposed on the light exit surface 122 of the first LGP 120 and the light exit surface 132 of the second LGP 130. The at least one display panel 230 has a first display region 230a (indicated in FIG. 1) and a second display region 230b (indicated in FIG. 1) overlapped with the light exit surface 122 of the first LGP 120 and the light exit surface 132 of the second LGP 130, respectively. For instance, in this embodiment, the at least one display panel 230 may selectively include a first display panel 231 and a second display panel 232 that are structurally separated from each other and respectively disposed on the light exit surface 122 of the first LGP 120 and on the light exit surface 132 of the second LGP 130; the first display panel 231 and the second display panel 232 may provide the first display region 230a and the second display region 230b of the display device 10, respectively. However, the disclosure is not limited to what is described above, and in other embodiments, two different regions of the same display panel may also serve as the first display region 230a and the second display region 230b. In this embodiment, the at least one display panel 230 is a non-self-illuminating display panel which may include but is not limited to a liquid crystal display panel.

With reference to FIG. 1, an intermediate non-display region 230c exists between the first display region 230a and the second display region 230b. An X direction is parallel to the light incident surfaces 123 and 133 and the light exit surfaces 122 and 132. The intermediate non-display region 230c has a width W in the X direction. For instance, in this embodiment, the width of the intermediate non-display region 230c is 0 mm<W≤6 mm, which should however not be construed as a limitation in the disclosure.

With reference to FIG. 2, in this embodiment, the display device 10 further includes a first optical film set 170 and a second optical film set 180 disposed on the light exit surface 122 of the first LGP 120 and the light exit surface 132 of the second LGP 130, respectively. The first optical film set 170 includes at least one first optical film 171. The second optical film set 180 includes at least one second optical film 181. For instance, in this embodiment, the first optical film set 170 may selectively include three first optical films 171, and the second optical film set 180 may selectively include three second optical films 181. The three first optical films 171 may be an upper diffusion sheet, a prism sheet, and a lower diffusion sheet, respectively. The three second optical films 181 may be an upper diffusion sheet, a prism sheet, and a lower diffusion sheet, respectively. However, the disclosure is not limited to what is disclosed above, and the number/type of the first optical film 171 of the first optical film set 170 and the number/type of the second optical film 181 of the second optical film set 180 may be determined and design according to actual needs.

In this embodiment, the display device 10 may selectively include a decorative outer panel 240, and the at least one display panel 230 is disposed between the decorative outer panel 240 and the first optical film set 170 and between the decorative outer panel 240 and the second optical film set 180. In this embodiment, the decorative outer panel 240 may not only decorate the appearance of the display device 10 but also be integrated with a touch function, which should however not be construed as a limitation in the disclosure.

With reference to FIG. 2 and FIG. 3, the display device 10 further includes a first fixing member 160. The first fixing member 160 is sandwiched between the bent portion 142 of the first reflection sheet 140 and the bent portion 152 of the second reflection sheet 150. Two opposite surfaces 162 and 164 of the first fixing member 160 are in contact with the bent portion 142 of the first reflection sheet 140 and the bent portion 152 of the second reflection sheet 150, respectively. In this embodiment, the first fixing member 160 is further sandwiched between the second portion 124b of the first side surface 124 of the first LGP 120 and the second portion 134b of the first side surface 134 of the second LGP 130, and the two opposite surfaces 162 and 164 of the first fixing member 160 are in contact with the second portion 124b of the first side surface 124 of the first LGP 120 and the second portion 134b of the first side surface 134 of the second LGP 130, respectively.

The first fixing member 160 is extendable and compressible. The first fixing member 160 is sandwiched between the bent portion 142 of the first reflection sheet 140 and the bent portion 152 of the second reflection sheet 150 and between the first side surface 124 of the first LGP 120 and the first side surface 134 of the second LGP 130, so as to further assemble and position the independent first LGP 120 and second LGP 130 and the independent first reflection sheet 140 and second reflection sheet 150 in the bezel 110.

In detail, in this embodiment, the display device 10 further includes a second fixing member 190. The second fixing member 190 is sandwiched between the light incident surface 123 of the first LGP 120 and the first sidewall 114 of the bezel 110 and between the light incident surface 133 of the second LGP 130 and the first sidewall 114 of the bezel 110, and the second fixing member 190 spans the first fixing member 160. The display device 10 further includes a third fixing member 200. The third fixing member 200 is sandwiched between the second side surface 125 of the first LGP 120 and the second sidewall 116 of the bezel 110 and between the second side surface 135 of the second LGP 130 and the second sidewall 116 of the bezel 110, and the third fixing member 200 spans the first fixing member 160. The display device 10 further includes a fourth fixing member 210. The fourth fixing member 210 is sandwiched between the second and third side surfaces 135 and 136 of the second LGP 130 and the second and third sidewalls 116 and 118 of the bezel 110. The display device 10 further includes a fifth fixing member 220 that is sandwiched between the second side surface 125 of the first LGP 120 and the second sidewall 116 of the bezel 110. The fourth fixing member 210 and the fifth fixing member 220 are disposed on two sides of the third fixing member 200. The second fixing member 190, the third fixing member 200, the fourth fixing member 210, and the fifth fixing member 220 may also have compressibility. In this embodiment, the first LGP 120 and the second LGP 130 are assembled and positioned in the bezel 110 due to the cooperation of the first fixing member 160, the second fixing member 190, the third fixing member 200, the fourth fixing member 210, and the fifth fixing member 220, which should however not be construed as a limitation in the disclosure.

For instance, in this embodiment, the first fixing member 160 may be an integrally formed super-strong adhesive material (including but not limited to: acrylic adhesive); the first fixing member 160 may absorb and/or reflect light; the appearance of the first fixing member 160 may be in black, silver or other colors; a material of the second fixing member 190, the third fixing member 200, the fourth fixing member 210, and the fifth fixing member 220 may, for instance, include silicon, which should however not be construed as a limitation in the disclosure. In this embodiment, the first fixing member has a width w in the X direction, and 0.15 mm≤w≤6 mm.

With reference to FIG. 1, FIG. 2, and FIG. 3, since the first fixing member 160, the first LGP 120, and the second LGP 130 may be assembled and positioned in the same bezel 110, the display device 10 having a small intermediate non-display region 230c with a small width W may be obtained. More importantly, the bent portion 142 of the first reflection sheet 140 and the bent portion 152 of the second reflection sheet 150 are adhered to the two opposite surfaces 162 and 164 of the first fixing member 160, respectively, which not only positions the first reflection sheet 140 and the second reflection sheet 150 but also prevents a light beam emitted by the first light emitting element 250 from leaking from the adjacent second display region 230b. Thereby, when the use scenario of the display device 10 is that the first display region 230a is required to display images while the second display region 230b is not required to display images (i.e., the first light emitting element 250 is turned on, while the second light emitting element 260 is turned off), the second display region 230b is not prone to encounter the abnormal light leakage phenomenon.

With reference to FIG. 2, in this embodiment, the first fixing member 160 is further disposed between the first optical film set 170 and the second optical film set 180. The two opposite surfaces 162 and 164 of the first fixing member 160 are further in contact with a sidewall 171a of the first optical film 171 and a sidewall 181a of the second optical film 181, respectively. In short, according to this embodiment, the first fixing member 160 may separate the first optical film set 170 from the second optical film set 180, so as to prevent the light beam emitted by the first light emitting element 250 from being transmitted transversely to the second display region 230b after the light beam is reflected/refracted by the first optical film 171. Thereby, the light leakage issue of the second display region 230b may be further resolved.

Note that the reference numbers and some content provided in the following embodiments are derived from the reference numbers and some content provided in the previous embodiments, the same reference numbers serve to denote the same or similar devices, and the description of the same technical content is omitted. The omitted description may be referred to as the description provided in the previous embodiments and will not be repeated in the following embodiments.

Figure 4:
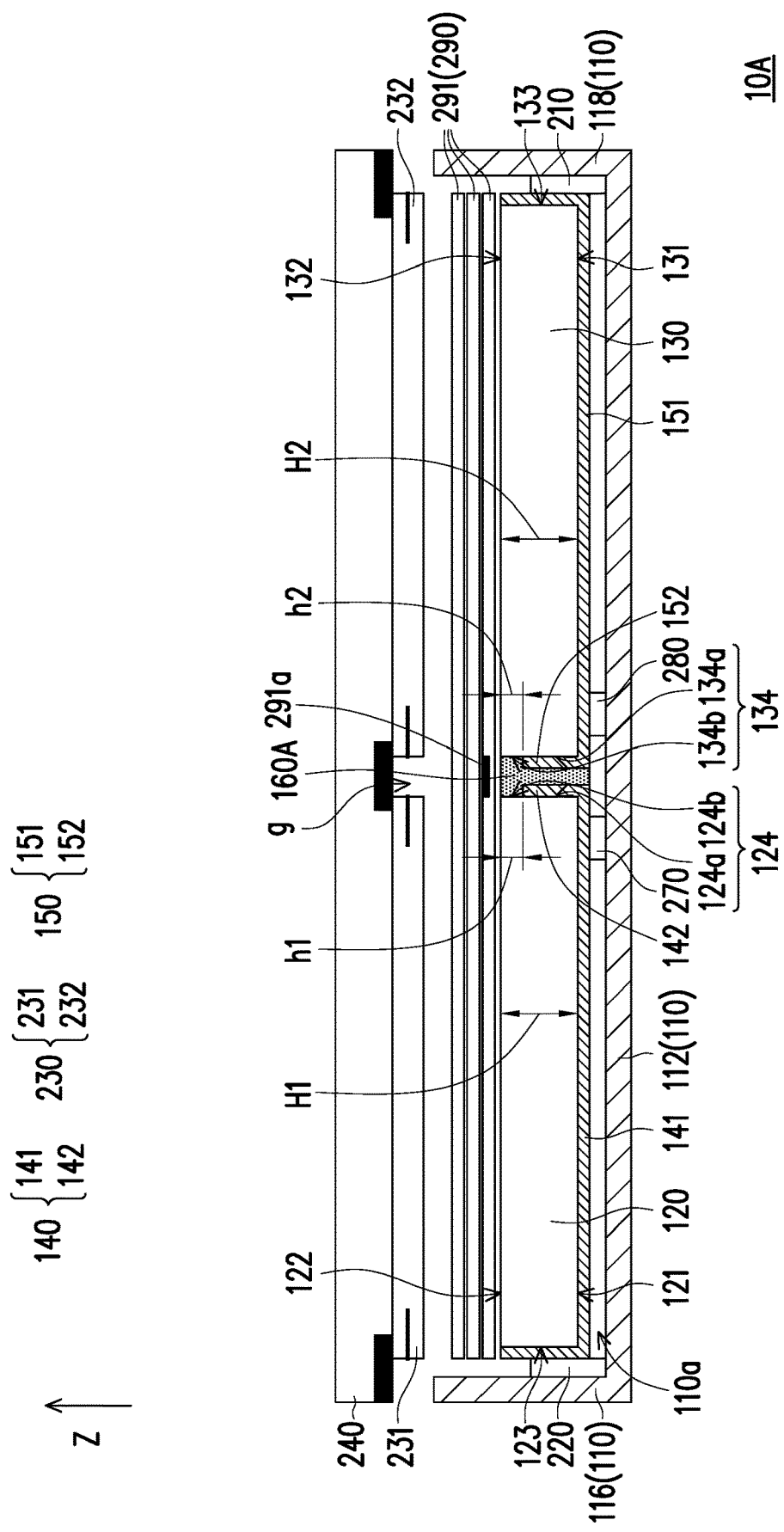
FIG. 4 is a schematic cross-sectional view of a display device according to another embodiment of the disclosure.

FIG. 4 is a schematic cross-sectional view of a display device according to another embodiment of the disclosure. A display device 10A depicted in FIG. 4 is similar to the display device 10 depicted in FIG. 2, and the difference between the two lies in that the display device 10A depicted in FIG. 4 includes one optical film set 290 that is disposed on the light exit surface 122 of the first LGP 120 and the light exit surface 132 of the second LGP 130 and located between the light exit surface 122 of the first LGP 120 and the at least one display panel 230 and between the light exit surface 132 of the second LGP 130 and the at least one display panel 230, where the optical film set 290 covers the first fixing member 160. That is, according to the embodiment shown in FIG. 4, the first fixing member 160 may not pass through the optical film set 290. In the embodiment shown in FIG. 4, an optical film 291 of the optical film set 290 may selectively have a light shielding pattern 291a that covers a gap g between the first display panel 231 and the second display panel 232 to better solve the light leakage problem.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
   a bezel, having accommodation space;
   a first light guide plate and a second light guide plate, disposed in the accommodation space of the bezel, wherein each of the first light guide plate and the second light guide plate has a bottom surface, a light exit surface, a light incident surface, and a first side surface, the bottom surface and the light exit surface are disposed opposite to each other, the light incident surface is connected between the bottom surface and the light exit surface, and the first side surface is connected between the bottom surface and the light exit surface and disposed on one side of the light incident surface;
   a first light emitting element and a second light emitting element, disposed in the accommodation space of the bezel and respectively located beside the light incident surface of the first light guide plate and the light incident surface of the second light guide plate;

a first reflection sheet and a second reflection sheet, disposed in the accommodation space of the bezel and respectively located between the bezel and the first light guide plate and between the bezel and the second light guide plate, wherein each of the first reflection sheet and the second reflection sheet has a bent portion, the bent portion of the first reflection sheet and the bent portion of the second reflection sheet are respectively disposed beside the first side surface of the first light guide plate and the first side surface of the second light guide plate, and the bent portion of the first reflection sheet and the bent portion of the second reflection sheet are located between the first side surface of the first light guide plate and the first side surface of the second light guide plate;

a first fixing member, sandwiched between the bent portion of the first reflection sheet and the bent portion of the second reflection sheet, wherein two opposite surfaces of the first fixing member are respectively in contact with the bent portion of the first reflection sheet and the bent portion of the second reflection sheet; and at least one display panel, disposed on the light exit surface of the first light guide plate and the light exit surface of the second light guide plate;

wherein each of the first reflection sheet and the second reflection sheet has a main portion, the main portion of the first reflection sheet is connected to the bent portion of the first reflection sheet, the main portion of the second reflection sheet is connected to the bent portion of the second reflection sheet, the main portion of the first reflection sheet is completely located between the first light guide plate and the bezel, and the main portion of the second reflection sheet is completely located between the second light guide plate and the bezel.

2. The display device according to claim 1, wherein the bent portion of the first reflection sheet covers a first portion of the first side surface of the first light guide plate but does not cover a second portion of the first side surface of the first light guide plate.

3. The display device according to claim 2, wherein the bent portion of the second reflection sheet covers a first portion of the first side surface of the second light guide plate but does not cover a second portion of the first side surface of the second light guide plate.

4. The display device according to claim 3, wherein the first fixing member is further sandwiched between the second portion of the first side surface of the first light guide plate and the second portion of the first side surface of the second light guide plate, and the two opposite surfaces of the first fixing member are respectively in contact with the second portion of the first side surface of the first light guide plate and the second portion of the first side surface of the second light guide plate.

5. The display device according to claim 1, wherein the bezel comprises a bottom board and a first sidewall extending upward from the bottom board, and the first light emitting element and the second light emitting element are respectively disposed between the first sidewall of the bezel and the light incident surface of the first light guide plate and between the first sidewall of the bezel and the light incident surface of the second light guide plate, the display device further comprising:

a second fixing member, sandwiched between the light incident surface of the first light guide plate and the first sidewall of the bezel and between the light incident surface of the second light guide plate and the first sidewall of the bezel, wherein the second fixing member spans the first fixing member.

6. The display device according to claim 5, wherein each of the first light guide plate and the second light guide plate further has a second side surface disposed opposite to the light incident surface and connected between the bottom surface and the light exit surface, and the bezel further comprises a second sidewall extending upward from the bottom board and disposed opposite to the first sidewall of the bezel, the display device further comprising:

a third fixing member, sandwiched between the second side surface of the first light guide plate and the second sidewall of the bezel and between the second side surface of the second light guide plate and the second sidewall of the bezel, wherein the third fixing member spans the first fixing member.

7. The display device according to claim 1, further comprising:

a first optical film set, disposed on the light exit surface of the first light guide plate and located between the light exit surface of the first light guide plate and the at least one display panel, wherein the first optical film set comprises at least one first optical film; and a second optical film set, disposed on the light exit surface of the second light guide plate and located between the light exit surface of the second light guide plate and the at least one display panel, wherein the second optical film set comprises at least one second optical film, and the first fixing member is further disposed between the first optical film set and the second optical film set.

8. The display device according to claim 7, wherein the two opposite surfaces of the first fixing member are further in contact with at least one sidewall of the at least one first optical film and at least one sidewall of the at least one second optical film, respectively.

9. The display device according to claim 1, further comprising:

an optical film set, disposed on the light exit surface of the first light guide plate and the light exit surface of the second light guide plate and located between the light exit surface of the first light guide plate and the at least one display panel and between the light exit surface of the second light guide plate and the at least one display panel, wherein the optical film set covers the first fixing member.

10. The display device according to claim 1, wherein a direction is parallel to the light incident surface and the light exit surface, the first fixing member has a width w in the direction, and 0.15 mm≤w≤6 mm.

11. The display device according to claim 1, wherein a height of the bent portion of the first reflection sheet is lower than a height of the first light guide plate, and a height of the bent portion of the second reflection sheet is lower than a height of the second light guide plate, so that a portion of the first fixing member contacts a top of the bent portion of the first reflection sheet and a top of the bent portion of the second reflective sheet.

12. The display device according to claim 1, wherein the first side surface of the first light guide plate has a width H1 in a direction, the first reflection sheet covers a first portion of the first side surface of the first light guide plate and does not cover a second portion of the first side surface of the first light guide plate, the second portion of the first side surface of the first light guide plate has a width h1 in the direction, and $1/4 \leq (h1/H1) \leq 1/2$;

wherein the first side surface of the second light guide plate has a width H2 in the direction, the second reflection sheet covers a first portion of the first side surface of the second light guide plate and does not cover a second portion of the first side surface of the second light guide plate, the second portion of the first side surface of the second light guide plate has a width h2 in the direction, and ¼≤(h2/H2)≤½.

13. A display device, comprising:
a bezel, having an accommodation space;
a first light guide plate and a second light guide plate, disposed in the accommodation space of the bezel, wherein each of the first light guide plate and the second light guide plate has a bottom surface, a light exit surface, a light incident surface, and a first side surface, the bottom surface and the light exit surface are disposed opposite to each other, the light incident surface is connected between the bottom surface and the light exit surface, and the first side surface is connected between the bottom surface and the light exit surface and disposed on one side of the light incident surface;
a first light emitting element and a second light emitting element are disposed in the accommodation space of the bezel, and are respectively located beside the light incident surface of the first light guide plate and the light incident surface of the second light guide plate;
a first reflection sheet and a second reflection sheet, disposed in the accommodation space of the bezel and respectively located between the bezel and the first light guide plate and between the bezel and the second light guide plate, wherein each of the first reflection sheet and the second reflection sheet has a bent portion, the bent portion of the first reflection sheet and the bent portion of the second reflection sheet are respectively disposed beside the first side surface of the first light guide plate and the first side surface of the second light guide plate, and the bent portion of the first reflection sheet and the bent portion of the second reflection sheet are located between the first side surface of the first light guide plate and the first side surface of the second light guide plate;
a first fixing member, sandwiched between the bent portion of the first reflection sheet and the bent portion of the second reflection sheet, wherein a direction is parallel to the light incident surface and the light exit surface, the first fixing member has a width w in the direction, and 0.15 mm≤w≤6 mm; and
at least one display panel, disposed on the light exit surface of the first light guide plate and the light exit surface of the second light guide plate;
wherein each of the first reflection sheet and the second reflection sheet has a main portion, the main portion of the first reflection sheet is connected to the bent portion of the first reflection sheet, the main portion of the second reflection sheet is connected to the bent portion of the second reflection sheet, the main portion of the first reflection sheet is completely located between the first light guide plate and the bezel, and the main portion of the second reflection sheet is completely located between the second light guide plate and the bezel.

14. The display device according to claim 13, wherein the bent portion of the first reflection sheet covers a first portion of the first side surface of the first light guide plate but does not cover a second portion of the first side surface of the first light guide plate.

15. The display device according to claim 14, wherein the bent portion of the second reflection sheet covers a first portion of the first side surface of the second light guide plate but does not cover a second portion of the first side surface of the second light guide plate.

16. He display device according to claim 15, wherein the first fixing member is further sandwiched between the second portion of the first side surface of the first light guide plate and the second portion of the first side surface of the second light guide plate between.

17. The display device according to claim 13, wherein the bezel comprises a bottom board and a first sidewall extending upward from the bottom board, and the first light emitting element and the second light emitting element are respectively disposed between the first sidewall of the bezel and the light incident surface of the first light guide plate and between the first sidewall of the bezel and the light incident surface of the second light guide plate, the display device further comprising:
a second fixing member, sandwiched between the light incident surface of the first light guide plate and the first sidewall of the bezel and between the light incident surface of the second light guide plate and the first sidewall of the bezel, wherein the second fixing member spans the first fixing member.

18. He display device according to claim 17, wherein each of the first light guide plate and the second light guide plate further has a second side surface disposed opposite to the light incident surface and connected between the bottom surface and the light exit surface, and the bezel further comprises a second sidewall extending upward from the bottom board and disposed opposite to the first sidewall of the bezel, the display device further comprising:
a third fixing member, sandwiched between the second side surface of the first light guide plate and the second sidewall of the bezel and between the second side surface of the second light guide plate and the second sidewall of the bezel, wherein the third fixing member spans the first fixing member.

19. The display device according to claim 1, further comprising:
a first optical film set, disposed on the light exit surface of the first light guide plate and located between the light exit surface of the first light guide plate and the at least one display panel, wherein the first optical film set comprises at least one first optical film; and
a second optical film set, disposed on the light exit surface of the second light guide plate and located between the light exit surface of the second light guide plate and the at least one display panel, wherein the second optical film set comprises at least one second optical film, and the first fixing member is further disposed between the first optical film set and the second optical film set.

20. The display device according to claim 19, wherein the two opposite surfaces of the first fixing member are further in contact with at least one sidewall of the at least one first optical film and at least one sidewall of the at least one second optical film, respectively.

21. The display device according to claim 13, further comprising:
an optical film set, disposed on the light exit surface of the first light guide plate and the light exit surface of the second light guide plate and located between the light exit surface of the first light guide plate and the at least one display panel and between the light exit surface of the second light guide plate and the at least one display panel, wherein the optical film set covers the first fixing member.

22. The display device according to claim 13, wherein a height of the bent portion of the first reflection sheet is lower than a height of the first light guide plate, and a height of the bent portion of the second reflection sheet is lower than a height of the second light guide plate, so that a portion of the first fixing member contacts a top of the bent portion of the first reflection sheet and a top of the bent portion of the second reflective sheet.

23. The display device according to claim 13, wherein the first side surface of the first light guide plate has a width H1 in a direction, the first reflection sheet covers a first portion of the first side surface of the first light guide plate and does not cover a second portion of the first side surface of the first light guide plate, the second portion of the first side surface of the first light guide plate has a width h1 in the direction, and $\frac{1}{4} \leq (h1/H1) \leq \frac{1}{2}$;

wherein the first side surface of the second light guide plate has a width H2 in the direction, the second reflection sheet covers a first portion of the first side surface of the second light guide plate and does not cover a second portion of the first side surface of the second light guide plate, the second portion of the first side surface of the second light guide plate has a width h2 in the direction, and $\frac{1}{4} \leq (h2/H2) \leq \frac{1}{2}$.

* * * * *